(12) United States Patent
Taniguchi et al.

(10) Patent No.: US 6,420,855 B2
(45) Date of Patent: Jul. 16, 2002

(54) VEHICULAR AC GENERATOR HAVING VOLTAGE CONTROL UNIT

(75) Inventors: Makoto Taniguchi, Kariya; Hiroaki Ishikawa, Nagoya; Koji Tanaka, Anjo, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/883,205

(22) Filed: Jun. 19, 2001

(30) Foreign Application Priority Data

Jun. 19, 2000 (JP) ........................................ 2000-183576
May 17, 2001 (JP) ........................................ 2001-148400

(51) Int. Cl.⁷ ................................................ H02H 7/06
(52) U.S. Cl. ........................................... 322/28; 322/29
(58) Field of Search ............................. 322/28, 29, 59, 322/69, 75, 80, 97, DIG. 2

(56) References Cited

U.S. PATENT DOCUMENTS

| 4,143,289 A | | 3/1979 | Williams |
| 4,297,631 A | | 10/1981 | Nicol et al. |
| 4,831,322 A | * | 5/1989 | Mashino et al. ............... 322/28 |
| 4,901,704 A | | 2/1990 | Safranek |
| 5,182,511 A | | 1/1993 | Pierret et al. |
| 5,266,882 A | * | 11/1993 | Morishita ..................... 322/28 |
| 5,376,876 A | | 12/1994 | Bauser et al. |
| 5,483,146 A | * | 1/1996 | Schultz et al. ................. 322/7 |
| 5,493,202 A | | 2/1996 | Iwatani et al. |
| 5,602,470 A | | 2/1997 | Kohl et al. |
| 5,606,246 A | * | 2/1997 | Adachi ........................ 322/8 |
| 5,886,500 A | * | 3/1999 | Iwatani et al. ............... 320/104 |
| 6,043,632 A | * | 3/2000 | Machara et al. ............... 322/28 |

FOREIGN PATENT DOCUMENTS

| JP | 5083998 | 4/1993 |
| JP | 6-284598 | 10/1994 |

* cited by examiner

*Primary Examiner*—Nestor Ramirez
*Assistant Examiner*—Thanh Lam
(74) *Attorney, Agent, or Firm*—Oliff & Berridge, PLC

(57) ABSTRACT

A vehicular AC generator comprises a resistor for ground one-phase output terminal in an armature coil, a switch for connecting and disconnecting at least one-phase output terminal out of the other phases of the armature coil to and from the ground, and a control unit for controlling the switch. The switch is controlled ON and OFF in accordance with a voltage generated across the resistor. According to this configuration, in the event of occurrence of leakage current in the armature coil, the occurrence of the leakage current is detected based on the voltage generated across the resistor and the switch is closed, whereby the leakage current is allowed to escape to ground and an actual signal from the resistor is detected easily.

13 Claims, 5 Drawing Sheets

VEHICULAR AC GENERATOR HAVING VOLTAGE CONTROL UNIT

CROSS REFERENCE TO RELATED APPLICATION

This application is based on and incorporates herein by reference Japanese Patent Application Nos. 2000-183576 filed on Jun. 19, 2000, and 2001-148400 filed on May 17,2001.

BACKGROUND OF THE INVENTION

1. Field of the Invention

The present invention relates to a vehicular AC generator and a voltage control unit for the same.

2. Description of Related Art

In an alternator, in addition to a power cable for the supply of generated electric power to a battery and miscellaneous electrical loads mounted on a vehicle, there are used several signal cables for signal communication between a device (hereinafter referred to as "regulator") for controlling a generated voltage of the alternator and the vehicle. Typical of such signal cables are an IG cable for detecting that a key switch provided on the vehicle is turned ON and for keeping the regulator active, an L cable for warning the vehicle driver of a trouble of the alternator or the battery, (in some case a common terminal is used for both IG and L terminals), and an S cable for detecting a battery voltage and for feeding it back to the regulator to monitor whether the battery voltage is in a controlled state within an appropriate range.

Out of these cables, the power cable is essential and cannot be omitted in view of its function, but the S cable can substantially be substituted by directly monitoring the voltage at an alternator output terminal and can be omitted. As to the L cable, the reliability of the alternator is improved to an extent equal to or even longer than the vehicle life and the number of vehicles not requiring warning is increased. Thus, the L cable can also be omitted.

However, as to the IG cable, some substitute means is needed for omitting the IG cable because it is not known when the key switch is turned ON.

For example, when electric power is fed to the regulator continuously and a power transistor is allowed to operate at an extremely low duty ratio, the alternator can start to generate an electric power immediately no matter when the engine may start. However, when the vehicle is left as it is without being used over a long period, the battery will eventually be exhausted by the electric current consumed in a field coil of the alternator.

When the field source is formed by a permanent magnet, not an electromagnet, the generation of power is started inevitably upon rotation of the alternator. However, the voltage control for a permanent magnet type generator is generally difficult and always requires a high operating torque. Thus, the permanent magnet type generator has disadvantage in view of efficiency and is not suitable for a vehicular AC generator.

U.S. Pat. No. 4,901,704 discloses to detect the rotation of an alternator by utilizing a Hall element. However, since the working environment of the alternator is not always good, there also arise such disadvantages as low reliability and high cost.

In an effort to overcome such disadvantages, JP-A-55-127849 and JP-A-6-84598 propose a method wherein a single-phase voltage in a multi-phases AC voltage induced by interlinkage of a magnetic flux with a multi-phases armature coil, which remains in a rotating magnetic pole as a constituent of a rotating-field type alternator is detected and the alternator rotates. That is, they disclose that the function of IG terminal can be substituted by detecting that an engine is started.

However, use of the technique disclosed in the above JP-A-55-127849 and JP-A-6-284598 under the working environment of the alternator which is not always good may result in the alternator being watered with muddy water or a saline solution, with consequent likelihood of such impurities being adhered to part of the armature coil and part of a rectifier, occurrence of leakage current and incapability of signal detection.

In view of these disadvantages, U.S. Pat. No. 5,602,470 proposes a method wherein a compensating resistor is connected to an output end of an armature coil so as to permit signal detection even when leakage of current occurs. It has turned out that for effectively distinguishing between noise and a actual signal by the method, no matter what leakage of current may occur in the armature coil, it is necessary to set the compensating resistor at a fairly small resistance. That is, that the leakage of current is consumed by the resistor of such a small resistance value means that part of an output current is consumed by the resistor during power generation of the alternator, so that the alternator works insufficiently.

Further, U.S. Pat. No. 5,182,511 discloses a technique wherein a potential difference between two-phase terminal voltages in a multi-phases AC voltage is detected by floating from ground. According to this technique, indeed it is possible to surely detect a voltage signal between two phases even when the leakage occurs. However, it was made clear that a reference voltage of a comparator, i.e., the power supply to a comparator, becomes complicated for comparing the floating voltage signal with a predetermined value. Further, once the alternator starts to generate power, an excessive voltage is applied to the comparator and miscellaneous protective means must be provided for ensuring a stable operation, thereby causing a disadvantage in mounting such that the circuit scale becomes too large.

SUMMARY OF THE INVENTION

An object of the present invention is to provide a voltage control unit for a vehicular AC generator capable of surely detecting a voltage signal produced between multi-phases coil terminals.

According to the present invention, a vehicular AC generator including a rotor provided with plural field poles, a field winding for magnetizing the field poles, a diode for return of an exciting current, the diode being connected in parallel with the field coil, an armature having a multi-phases coil and adapted to receive a rotating magnetic field created by the rotor and induce an AC voltage, and a control unit which controls an electric current flowing through the field coil and controls an output. vc sage, wherein a resistor connected between one-phase output terminal in the multi-phases coil and a negative pole potential of a vehicular battery, as well as a switch means for connecting and disconnecting at least one-phase output terminal out of the other phases in the multi-phases coil to and from the negative pole potential of the vehicular battery, are provided. Therefore, when the switch means is closed in the event of occurrence of leakage current in the armature coil, the leakage current returns to the vehicular battery through the switch means, so that a voltage based on leakage current is not generated in the voltage across the resistor. That is, a signal produced between the multi-phases coil terminals can be detected distinctly from noise.

When the rotor rotates in the absence of leakage current, an electromotive force caused by residual magnetism in the field poles constituting the rotor is induced in the armature coil. In this case, when the switch means is opened, that is, in the conventional circuit configuration, about 0.7V of a forward voltage drop of diode is present in the circuit composed of the negative-side diode in X phase, the resistor and the armature coil, while in a reverse-biased period of the diode, the diode is cut off and no current flows in the resistor, thereby resulting a half-wave rectifying action. Consequently, the voltage across the resistor becomes an extremely small signal, so that it is difficult to detect the voltage.

However, in the present invention, when the switch means is closed, any factor which brings about a half-wave rectification or a large voltage drop is not present in the closed circuit composed of the switch means, the resistor and the armature coil. Accordingly, the voltage across the resistor is obtained as a large signal, so that the signal is easily detected.

Further, since the switch means is controlled to turn ON and OFF in accordance with the voltage across the resistor, the switch means can be turned ON and OFF irrespective of whether leakage current is present or not. When there is leakage current, it is possible to separate between noise caused by the leakage of current and an actual signal.

The larger the number of rotations of the rotor is, the larger the magnitude of the voltage generates across the resistor is. That is, when the number of rotations of the rotor is not smaller than a predetermined number and the applied voltage has become larger, the switch means is opened. Thus, it is possible to prevent the generation of heat and insulation breakdown by flowing of a large current in the switch means.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
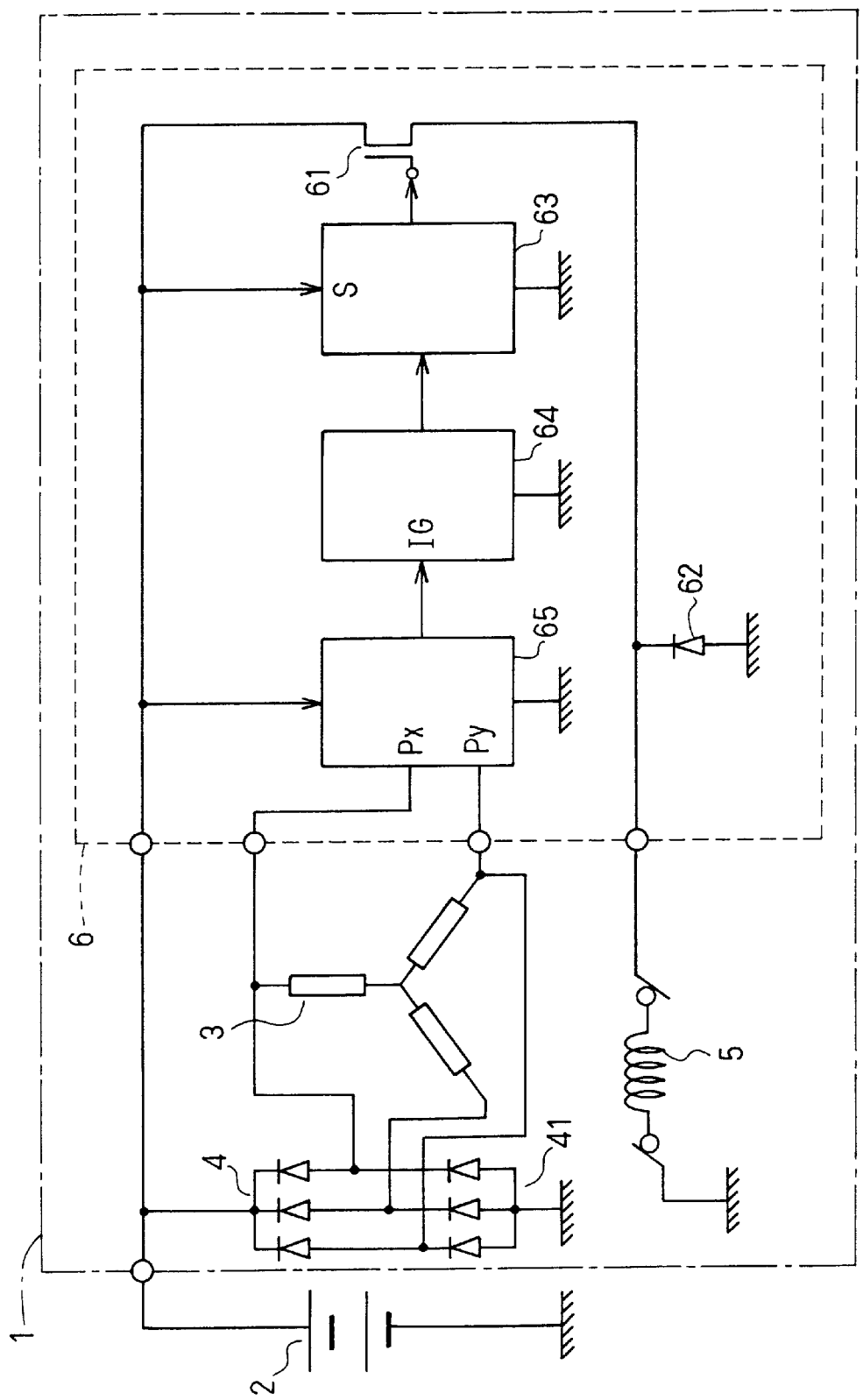
FIG. 1 is a block diagram showing a constitution of the present invention.

FIG. 1 is a block diagram showing the configuration of the first embodiment.

FIG. 1 shows an alternator 1 according to the present invention, a vehicular battery 2, a three-phase coil forming the alternator 1, a full-wave rectifier circuit 4 connected to output terminals of the three-phase coil 3, a field coil 5 wound around a revolving magnetic pole (not shown) which generates an alternating field for interlinkage with the three-phase coil 4, and a voltage control unit 6 which adjusts the field current to be passed through the field coil 5 and controls an output voltage of the alternator 1 within a predetermined range.

The voltage control unit 6 includes a power transistor 61, a fly-wheel diode 62, a voltage control circuit 63, a main power supply circuit 64, and a sub power supply circuit 65. The power transistor 61 is connected to the field coil 5 to turn ON and OFF the field current. The fly-wheel diode 62 causes the field current to return when the power transistor 61 is OFF. The voltage control circuit 63 monitors the output voltage of the full-wave rectifier circuit 4 and produces a signal for driving the power transistor 61 so that the output voltage is within a predetermined range. The main power supply circuit 64 supplies electric power to keep the voltage control circuit 63 ON. The sub power supply circuit 65, upon receipt of two-phase output voltage signals Px and Py from the three-phase coil 3, detects from the input voltage signals that a rotor rotates and outputs a signal for operating the main power supply circuit.

Figure 2:
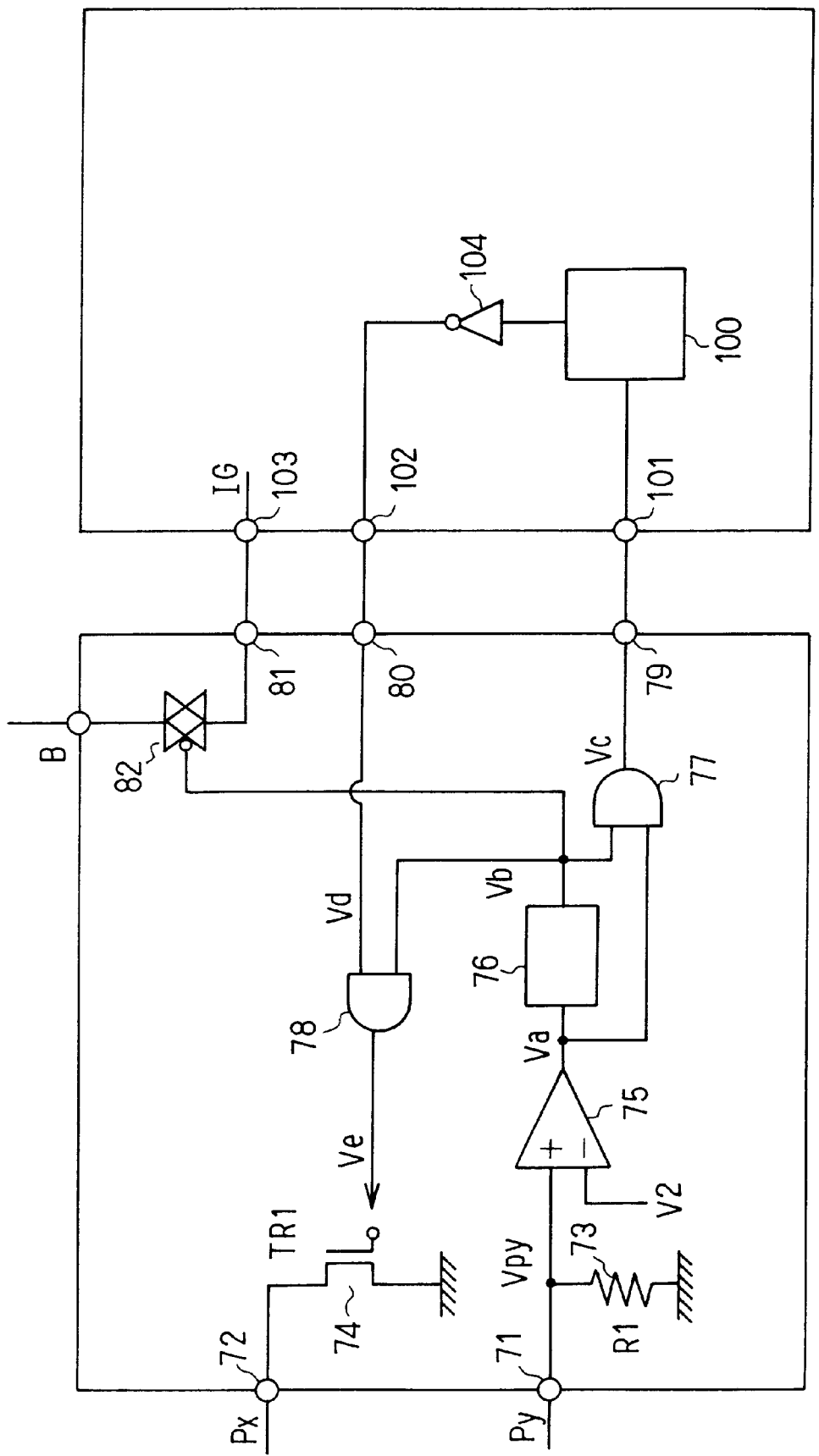
FIG. 2 is a block diagram showing a sub power supply circuit (first embodiment)

FIG. 2 shows a detailed configuration of the sub power supply circuit 65.

The sub power supply circuit 65 includes an input terminal 71 for inputting a Y-phase terminal voltage from the coil 3, an input terminal 72 for inputting an X-phase terminal voltage from the coil 3, a ground resistor 73 for connecting a Y-phase output terminal with ground, and a switch means TR1 74 for connecting and disconnecting an X-phase output terminal to and from ground. The switch means 74 is formed by a MOSFET in the present embodiment. An ON-state resistance of the MOSFET is set sufficiently smaller than the resistance of the ground resistor R1. For example, R1=1 kΩ, $R_{TR1}=1\Omega$.

The sub power supply circuit 65 further includes a comparator 75, a first timer circuit 76, a first AND gate 77, a second AND gate 78, and an analog switch 82.

The comparator 75 compares the voltage of the ground resistor R1 73 with a predetermined value V2. The first timer circuit 76, with a leading or trailing edge of an output signal Va from the comparator 75 as a trigger point, outputs a Hi signal for only a first predetermined time T1. The first AND gate 77 calculates a logical product of the output signal Vb of the first timer circuit 76 and the output signal Va of the comparator 75. An output signal Vc of the first AND gate 77 is input through an output terminal 79 of the sub power supply circuit 65 to an input terminal 101 of the main power supply circuit 64. The second AND gate 78 calculates a logical product of the output signal Vb of the first timer circuit 76 and an output signal Vd of the main power supply circuit 64 input from an input terminal 80. An output signal Ve from the second AND gate 78 turns ON and OFF the switch means 74. The analog switch 82 is operated by the output signal Vb from the first timer circuit 76 and is connected between an output potential of the generator and an output terminal 81 of the sub power supply circuit 65. When the output signal from the sub power supply circuit 65 is at Hi level, the main power supply circuit 64 is kept ON.

A counter circuit 100 forms a part of the main power supply circuit 64 and counts the number of pulses of the output signal Vc from the sub power supply circuit 65. An output signal from the counter circuit 100 is applied to an output terminal 102 of the main power supply circuit 64 through an inverter 104. The counter circuit 100 is set so as to output a signal of Hi level when a predetermined number of pulses are input. The predetermined number of pulses corresponds to a first predetermined rotation number in the present invention.

An operation of the present embodiment will be described.

When a Y-phase output voltage Vpy of the coil 3 exceeds a second predetermined value V2, the comparator 75 is inverted and the level of the output signal Va becomes Hi. The second predetermined value V2 is preferably set at a value of one tenth or less of a rated voltage of the vehicular AC generator, e.g., 0.4V or so. With a leading edge of pulse of the output signal Va from the comparator 75 as a trigger point (t1), the first timer circuit 76 outputs Hi level signals only for the first predetermined time T1. The analog switch 82 is closed upon output of a Hi level signal from the first timer circuit 76. That is, the main power supply circuit 64 is active for only the predetermined time T1.

The main power supply circuit 64 receives from the sub power supply circuit 65 an AND signal Vc of the comparator output signal Va and the first timer circuit output signal Vb. The number of pulses of the signal Vc is counted by the counter circuit 100 in the main power supply circuit 64. When a predetermined number of pulses are input, a Hi level signal is output. An inverted output signal from the counter circuit 100 is again input to the sub power supply circuit 65 and is further input to the second AND gate 78.

For example, when the Y-phase voltage Vpy is raised by leakage current while the rotor stops, the comparator 75 inverts itself and outputs a Hi level signal. As a result, the first timer circuit 76 operates and outputs Hi level signals for only the first predetermined time T1, turning ON the main power supply circuit 64 for only the first predetermined time T1. Since the output of the counter circuit 100 in the main power supply circuit 64 is at Lo level, both inputs to the second AND gate 78 are at Hi level, so that the switch means 74 is closed, thereby allowing leakage current to escape immediately to ground through the switch means 74. After the predetermined time, the main power supply circuit 64 is again kept OFF. These operations are repeated as long as leakage current exists.

On the other hand, when the Y-phase voltage is a voltage caused by the rotation of the rotor, not by leakage current, the main power supply circuit 64 is allowed to operate for only the first predetermined time from the leading edge of the comparator output. At this time, since a pulse signal is contained in the output signal Vc of the first AND gate 77, the counter circuit 100 counts the number of pulses. In the case where a predetermined number of pulses or more are not inputted, the output level of the counter circuit remains Lo, and after the first predetermined time T1, the main power supply circuit 64 is turned OFF. When the number of pulses increases with an increase in the number of rotation and reaches the predetermined number of pulses, the counter circuit 100 outputs a Hi level signal to open the switch means 74. The supply of electric power to the voltage control circuit 63 is started to start the generated voltage control.

Further, when both a DC voltage based on leakage current and a fluctuating voltage caused by rotation of the rotor are mixed together in Y phase, the main power supply circuit 64 starts operation simultaneously with inversion of the comparator 75 and the number of pulses contained in the output signal Vc is counted. Until the predetermined number or more of pulses are input, the switch means 74 is closed to eliminate the DC voltage based on leakage current, as described above.

When the switch means 74 is closed, an electric current flows in a closed loop circuit formed by the switch means 74, the ground resistor R1 73 and X-, Y-phase coils under the action of an electromotive force induced by interlinkage of a magnetic flux with the coil 3, the magnetic flux being created by residual magnetism in the foregoing field poles. Thus, a voltage Vpy is generated across the ground resistor R1 73. The magnitude of the voltage Vpy is larger in case of the switch means 74 being closed than in case of the switch means 74 being open.

When the switch means 74 is open, a normally closed loop circuit is not existent and an electric current is circulated by a half-wave rectifier circuit formed by a rectifier diode 41 connected to the X phase, the ground resistor R1 and X and Y phases. But, in this case, a forward voltage drop of the rectifier diode 41 is about 0.7V. On the other hand, since the electromotive force applied to this half-wave rectifier circuit is caused by magnetism remaining the field poles as described above, there is obtained only an extremely small voltage of 1.2V or so. When the switch means 74 is open, about 0.5V, out of the about 1.2V, comes from division by the diode 41, with the result that there appears only about 0.5V as a voltage drop of the ground resistor R1 73. Besides, since this voltage signal is a half-wave signal, the detection thereof is extremely difficult.

Contrary to this, when the switch means 74 is closed, a normally closed loop is formed as described above, whereby the alternating current can be circulated. Besides, in the circuit there is no element that brings about a voltage drop, such as a diode, so there is obtained a relatively large voltage and it becomes easy to effect the detection. Thus, when the switch means 74 is closed, it is possible to substantially amplify the voltage developed across the ground resistor R1 73.

As the signal of Vpy is amplified, the chance of exceeding the predetermined value V2 increases and hence the number of pulses input to the counter circuit 100 becomes the predetermined number or more. Then, as described above, the switch means 74 is opened, keeping the main power supply circuit 64 to be active to continue the supply of electric power to the voltage control circuit 63, and the generated voltage control for the generator is started.

As explained above, even when a leakage current exists in the coil 3 of the generator, it is possible, by turning ON and OFF the switch means 74, to easily eliminate a noise signal caused by the leakage current and detect only a signal based on the rotation of the rotor. As a result there can be provided a control unit capable of easily detecting the start of rotation of the rotor.

(Second Embodiment)

According to the first embodiment, since the counter circuit 100 is mounted within the main power supply circuit 64, there arise the problems that, at a small number of rotations of the rotor, the main power supply circuit 64 repeats ON and OFF, thereby causing switching noise or switching loss, or a somewhat unstable operation results, and that the power consumption of the circuit is too large for only the distinction between noise and a true rotation signal.

The second embodiment of the present invention will be described with reference to FIG. 3.

The second embodiment solves the problems of the first embodiment.

Figure 3:
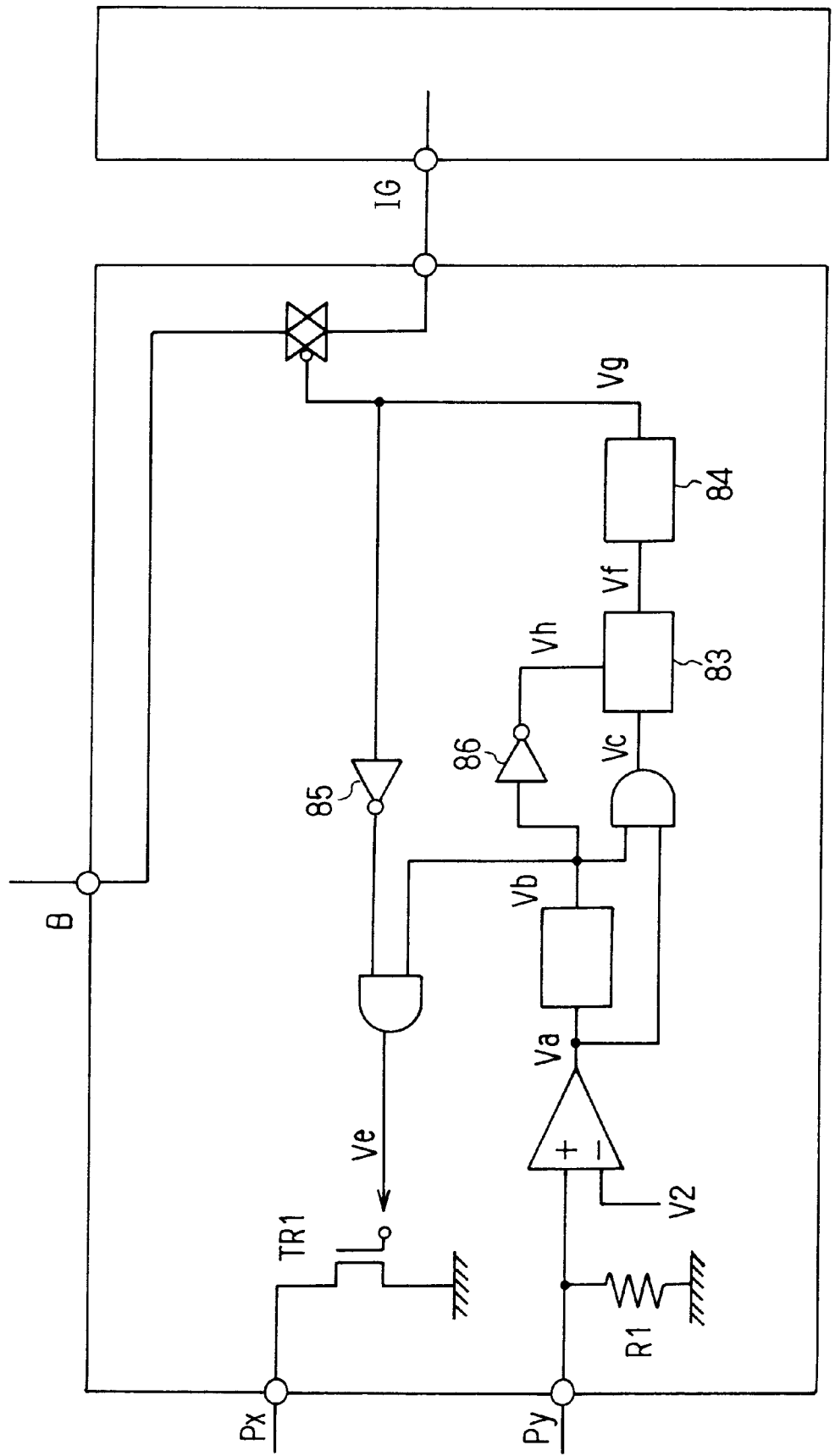
FIG. 3 is a block diagram showing a sub power supply circuit (second embodiment)

As shown in FIG. 3, the second embodiment includes a counter circuit 83, a second timer circuit 84, a first inverter 85, and a second inverter 86.

The counter circuit 83 counts the number of pulse signals output from the first AND gate 77 and is set so as to output a Hi level signal upon input of a predetermined number of pulses. The second timer circuit 84, with a leading or trailing edge of an output signal Vf from the counter circuit 83 as a trigger point, outputs a Hi level signal for only a second predetermined time T2. In the second embodiment, a trailing edge of the output signal Vf is set as a trigger point. The second predetermined time T2 is set longer than the first predetermined time T1. The first inverter 85 inverts the output signal of the second timer circuit 84 and an output signal thereof is input to the second AND gate 78. An output signal Ve of the second AND gate 78 turns ON and OFF the switch means 74. The second inverter 86 inverts the output signal Vb of the first timer circuit 76 and resetting the counter circuit 83 when the output level is Hi. As an operation signal for the analog switch 82, an output signal Vg of the second timer circuit 84 is used.

Figure 4:
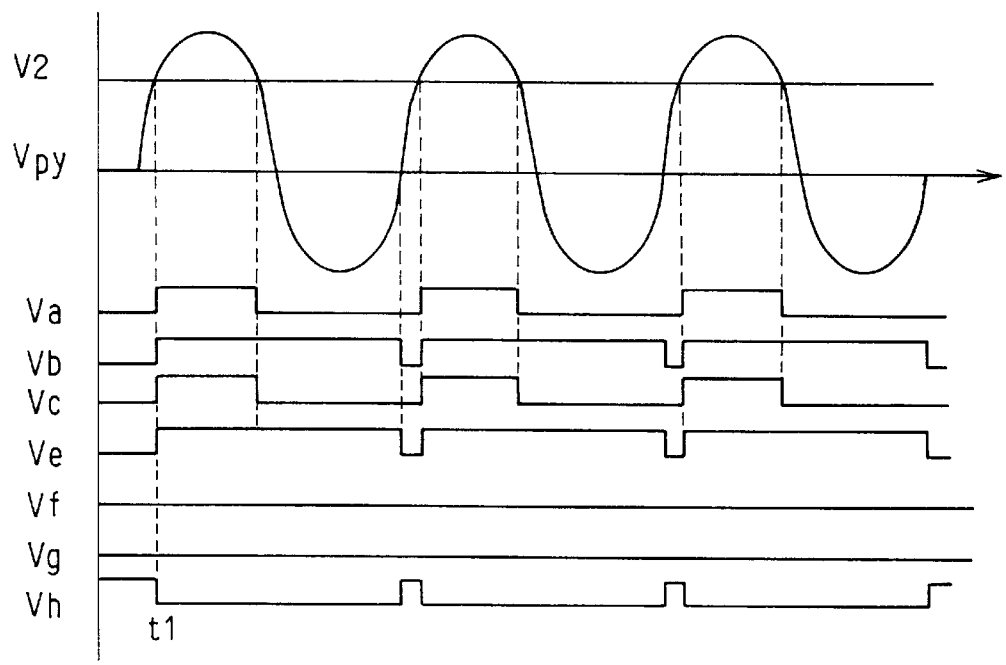
FIG. 4 is a timing chart showing an operation at a small number of rotor rotations (second embodiment)

An operation of the second embodiment will be described with reference to FIGS. 4 and 5. FIG. 4 is an operation time chart in case of the number of rotations of the rotor being small, and FIG. 5 is an operation time chart in case of the number of rotations of the rotor being large.

The counter circuit 83 counts the AND signal Vc of the comparator output signal Va and the first timer circuit output signal Vb. In the second embodiment, upon input of the fourth pulse, a Hi level signal is output for only a Hi level period of the fourth pulse and the count number is reset with an inverted signal Vh of the pulse signal Vb. In a low rotation number region in FIG. 4, the frequency of Vpy is low and hence a predetermined number of pulses are not input during Hi level of the first timer, so that the output Vf of this counter circuit remains Lo level. Accordingly, the second timer circuit 84 does not start to operate and the analog switch 82 remain to open, so that it impossible to operate the main power supply circuit 64.

Figure 5:
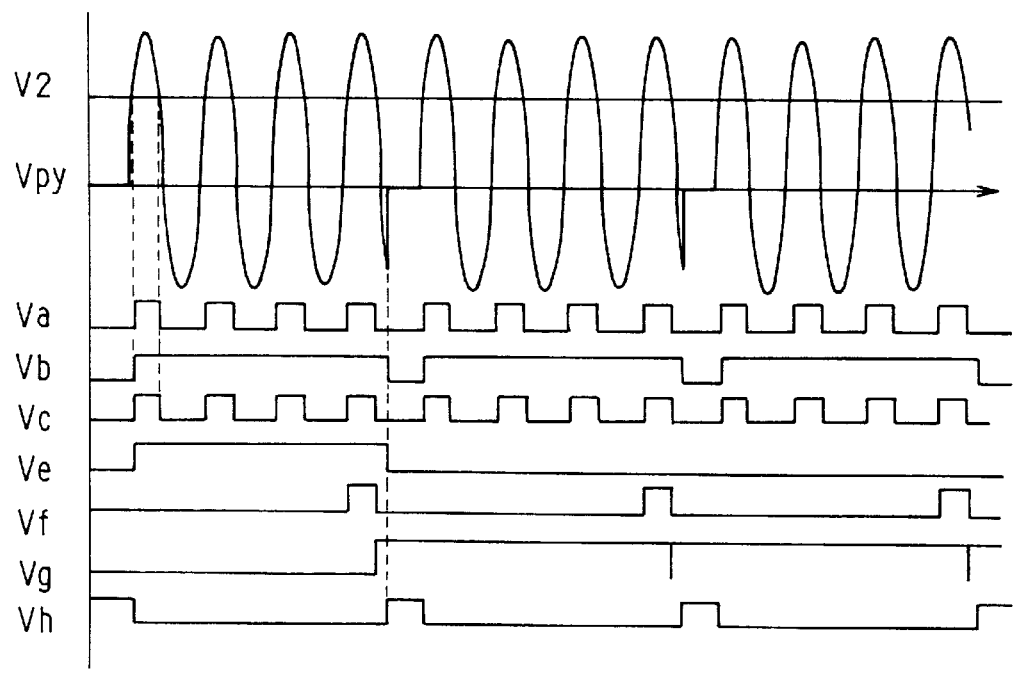
FIG. 5 is a timing chart showing an operation at a large number of rotor rotations (second embodiment)

Next, with reference to FIG. 5, the following description is provided about the case where the number of rotations of the rotor is high.

In this case, the fundamental frequency of the voltage Vpy developed across the ground resistor R1 73 becomes high and the voltage Vpy corresponding to four or more cycles required in the predetermined time T1 of the first timer circuit 76 is input to the comparator 75. That is, as to the output signal Va of the comparator 75, four pulse signals are output in T1 period. Upon input of the fourth pulse signal the counter circuit 78 outputs a Hi level signal Vf. Upon receipt of this pulse signal Vf, the second timer circuit 84, with a trailing edge of Vf as a trigger point, outputs a Hi level signal Vg for only the second predetermined time T2. The signal Vg causes the analog switch 82 to be closed and "B" potential to be available at the output terminal 81. Since the vehicle battery 2 is usually connected to B terminal, the B potential is applied with the voltage of the vehicle battery 2. To be more specific, while the analog switch 82 is closed, the main power supply circuit 64 turns ON and the output voltage control in the alternator 1 is started at once.

At the same time, the signal Vg is inverted by the inverter 85, causing the switch means 74 to become open immediately even when the first timer outputs a Hi level signal. Thus, the generated voltage induced in the coil 3 of the alternator 1 is cut off from ground to prevent the occurrence of the phenomenon that the generator output is consumed by the switch means 74.

Assuming that the fourth pulse signal is output as the output signal Va of the comparator 75 despite the number of rotations of the rotor not having reached the predetermined value yet, the counter counts the fourth pulse, but since this signal is a noise signal caused by some reason, it ought not to appear at the time of the next counting. Thus, the main power supply circuit 64 is once turned ON, but after the second preset time, the second timer circuit 84 does not operate and therefore the main power supply circuit 64 is turned OFF at once.

On the other hand, while the rotor rotates at the predetermined number of rotations or more, the number of output pulses from the comparator 75 is sure to be four or more pulses, so the second timer circuit 84 outputs Hi level signals continuously, thereby keeping the main power supply circuit 64 ON constantly.

Here, the count number for the counter is set to four. Alternatively, no limitation is made thereto and it may be set to any other number. A description will be given about the relation of the count number set for the counter to the first and second predetermined times T1, T2.

First, the first predetermined time will be explained. The first timer circuit 76 causes the switch means TR1 74 to be closed for only the predetermined time T1. Further, with the first timer circuit 76, it is intended to make distinction whether the voltage signal generated across the ground resistor R1 73 during the closing period of the switch means 74 is caused by noise such as leakage current or is a true signal. As described above, when the rotor rotates with the switch means 74 closed, the signal Vpy generated across the ground resistor 73 becomes an AC voltage signal. The fundamental frequency of this AC voltage depends on the number of rotations of the rotor. The smaller the number of rotations is, the lower the fundamental frequency is. The larger the number of revolutions is, the higher the fundamental frequency is. Thus, the number of pulses, VC, produced during the operation period T1 of the first timer varied depending on the number of rotations. For example, when the number of the field poles is sixteen and the rotor is rotating at 1000 rpm, the fundamental frequency of Vpy is 133.3 Hz. It is known well that when a rotor having 2 p of field poles is rotating at N rpm, the fundamental frequency of Vpy is (N×p)/60 [Hz]. When the predetermined number of rotations (the first predetermined value) to be detected is N0 rpm and the count number set for the counter circuit 83 is k, that is, if a Hi level signal is output at the $k^{th}$ pulse, the first predetermined time T1 should be more than following value:

$$T1=60/(N0 \times p) \times (K+1) \text{ [sec]}$$

By this setting, when the rotor rotates at the predetermined number of rotations or at a higher speed, k number of pulse signals are sure to be produced in the T1 period. For example, when four pulses are used to detect 1000 rpm of the rotor having sixteen field poles, T1 should be set more than 37.5 msec.

Next, the second predetermined time will be explained. With the second timer circuit 84, it is intended to detect and determine whether a predetermined number or more of pulses are input constantly to the counter, i.e., whether the rotor is rotating at a predetermined number or more of rotations. Therefore, it is sufficient for the second predetermined time T2 to be set longer by one pulse than the first predetermined time, i.e., a value obtained by the following equation or a larger value:

$$T2=60/(N0 \times p) \times (k+2) \text{ [sec]}$$

When it is applied to the above example, T2 may be set more than 45 msec.

According to the above-described embodiments of the present invention, it is possible to surely distinguish between noise and a true signal induced by rotation of the rotor, and in the event of occurrence of leakage current, it is possible to keep OFF the main power supply circuit positively.

Even when an erroneous detection should be made due to the generation of noise, the main power supply circuit operates once, but is immediately turned OFF, so that electric power is not wasted.

On the other hand, when the rotor is actually rotating, the main power supply circuit 64 is turned ON immediately and the switch means 74 is closed. Thus, wasteful consumption of the generator output power is avoided easily.

Thus, as in the above-described embodiments, by merely providing switch means 74 connecting and disconnecting one phase of the three-phases coil 3 to ground and a control circuit for the switch means 74, it is possible for the generator itself to detect the start of rotation of the rotor and start the generation control without receiving from the exterior of the vehicle AC generator any signal for monitoring the state of the vehicle and of the engine. That is, only the cable for the supply of electric power to the vehicular battery and electrically loaded devices is needed and all the other signal cables can be omitted.

Here, the timer circuit and the counter circuit both referred to in the embodiments is constructed by using well known digital technique, so that detailed explanations thereof are omitted.

(Modification)

Figure 6:
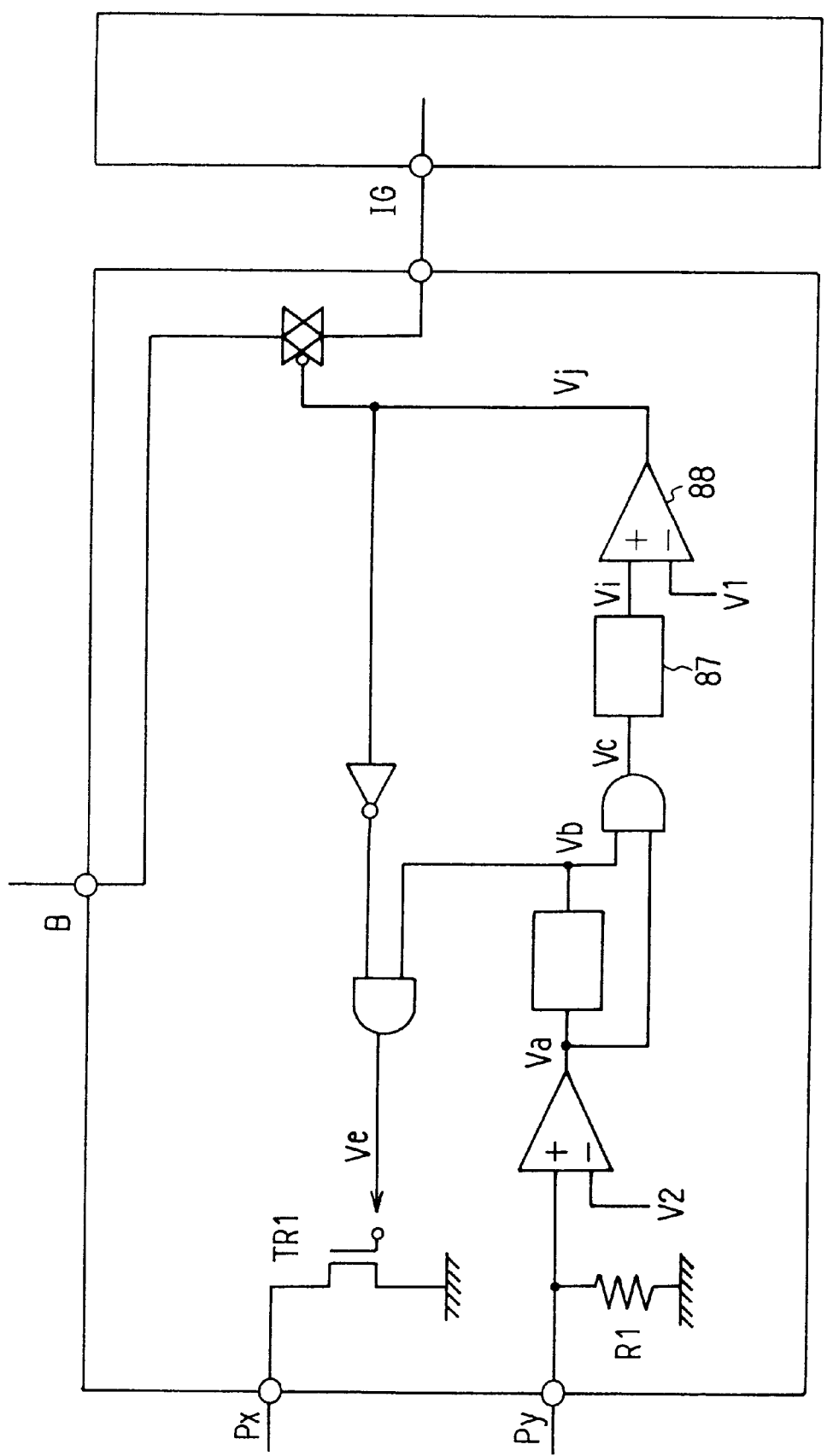
FIG. 6 is a block diagram showing a sub power supply circuit (modification).

FIG. 6 shows a modification of the second embodiment.

In the second embodiment, the counter circuit 83 is used to detect whether the number of rotations of the rotor has reached a predetermined value or more. Alternatively, in this modification, F/V converter 87 and second comparator 88 are used instead of the counter circuit 83.

An operation performed when the rotor is not in rotation, it is the same as in the first embodiment.

On the other hand, when the rotor is rotating, a pulse train with a frequency corresponding to the number of rotations of the rotor is generated in the output signal Va of the first comparator 75. Out of the pulse signals, those generated during a closed period of the switch means, i.e., during the first predetermined time T1, are input to an F/V converter 87 to be converted into analog signals Vi. The analog signals Vi vary in accordance with the number of rotations of the rotor. That is, the analog signals Vi are large when the number of rotations of the rotor is large, and the analog signals Vi are small when the number of rotations of the rotor is small.

Whether the number of rotations of the rotor is more than a predetermined value is easily detected by comparing the analog signals with the first predetermined value V1. The first predetermined value V1 may be set to a value corresponding to the number of rotations to be detected. If necessary, a low-pass filter may be inserted after the F/V converter to improve detection accuracy.

According to the present modification, the number-of-revolutions detecting accuracy is more improved than the pulse counting method described in the first embodiment.

What is claimed is:

1. A vehicular AC generator comprising:
    a rotor including a plurality of field poles;
    a field coil for magnetizing said field poles;
    a diode connected in parallel with said field coil for returning an exciting current;
    an armature having an armature core provided with a multi-phase coil, said multi-phase coil inducing an AC voltage by receiving a rotating magnetic field generated by said rotor;
    an output voltage control unit controlling an electric current flowing through said field coil to control an output voltage of said vehicular AC generator;
    a resistor connected between one-phase output terminal of said multi-phase coil and a negative pole potential of a vehicular battery; and
    switch means for connecting and disconnecting at least one of remaining-phase output terminal of said multi-phase coil to and from the negative pole potential of said vehicular battery, wherein
    said output voltage control unit includes means for detecting a voltage generated across said resistor, and intermittently controls said switch means in accordance with the voltage generated across said resistor, and
    said output voltage control unit opens said switch means when a number of rotations of said rotor exceeds a predetermined number of rotations.

2. A vehicular AC generator according to claim 1, wherein
    said output voltage control unit further includes means for detecting an amount of electricity corresponding to a frequency of the voltage generated across said resistor, and
    the number of rotations of said rotor is detected based on the amount of electricity for determining whether the number of rotations of said rotor exceeds the first predetermined number of rotations or not.

3. A vehicular AC generator according to claim 1, wherein the first predetermined number is smaller than twice a number of rotations at a start of generation of the vehicular AC generator.

4. A vehicular AC generator according to claim 3, wherein said resistor and said switch means are mounted within said output voltage control unit.

5. A vehicular AC generator according to claim 4, wherein said switch means is bidirectionally conductive.

6. A vehicular AC generator according to claim 5, wherein a resistance value at a closed state of said switch means is smaller than that of said resistor connected between one-phase output terminal of said multi-phases coil and the negative pole potential of said vehicular battery.

7. A vehicular AC generator according to claim 6, wherein said bidirectionally conductive switch means is a MOSFET.

8. A vehicular AC generator according to claim 4, wherein
    said output voltage unit further includes an output voltage control circuit and a main power supply circuit for supplying electric power to said output voltage control circuit, and
    said main power supply circuit is turned ON in accordance with the voltage generated across said resistor.

9. A vehicular AC generator according to claim 8, wherein when the voltage generated across said resistor exceeds a first predetermined voltage, said main power supply circuit is turned ON for only a first predetermined period.

10. A vehicular AC generator according to claim 9, wherein when the voltage generated across said resistor exceeds the first predetermined voltage, said switch means is closed for only the first predetermined period.

11. A vehicular AC generator according to claim 10, wherein when said switch means is closed and when an amount of electricity corresponding to a frequency of the voltage generated across said resistor exceeds an amount corresponding to the first predetermined number of rotations, said main power supply circuit is turned ON for only a second predetermined period.

12. A vehicular AC generator according to claim 11, wherein the second predetermined period is longer than the first predetermined period.

13. A vehicular AC generator according to claim 9, wherein
    when the voltage generated across said resistor exceeds the first predetermined voltage, said switch means is closed, and
    when the voltage exceeds a second predetermined voltage which is larger than the first predetermined voltage, said switch means is opened.

* * * * *